United States Patent
Behlinger et al.

(10) Patent No.: US 7,441,743 B2
(45) Date of Patent: Oct. 28, 2008

(54) FASTENING ARRANGEMENT OF A MACHINE BASE AND METHOD OF FASTENING THE SAME

(75) Inventors: Thomas Behlinger, Laufenburg (DE); Manfred Kunz, Albbruck (DE); Thomas Olive, Winterthur (CH); Michael Lukas Don Yong Prochazka, Baldingen (CH)

(73) Assignee: ALSTOM Technology Ltd., Baden (CH)

( * ) Notice: Subject to any disclaimer, the term of this patent is extended or adjusted under 35 U.S.C. 154(b) by 142 days.

(21) Appl. No.: 10/876,601

(22) Filed: Jun. 28, 2004

(65) Prior Publication Data

US 2004/0261340 A1 Dec. 30, 2004

(30) Foreign Application Priority Data

Jun. 27, 2003 (CH) ..................................... 1141/03

(51) Int. Cl.
*F16M 5/00* (2006.01)
*F16M 7/00* (2006.01)
*E04B 1/38* (2006.01)
*E02D 27/00* (2006.01)
*E02D 27/32* (2006.01)

(52) U.S. Cl. ............................. 248/679; 52/707; 52/295

(58) Field of Classification Search .................. 52/295, 52/296, 704, 705, 745.21, 741.15, 707; 248/678, 248/679; 411/107
See application file for complete search history.

(56) References Cited

U.S. PATENT DOCUMENTS

| 2,625,815 | A |   | 1/1953 | Black |
| 2,952,947 | A |   | 9/1960 | White |
| 3,401,733 | A |   | 9/1968 | Circle |
| 3,767,148 | A | * | 10/1973 | Crowdy .................... 248/680 |
| 3,867,804 | A | * | 2/1975 | Wilson ....................... 52/699 |
| 4,029,275 | A | * | 6/1977 | Erismann .................. 248/680 |
| 4,198,798 | A | * | 4/1980 | Haydock .................... 52/699 |
| 4,834,197 | A |   | 5/1989 | Bauer et al. |
| 5,016,338 | A | * | 5/1991 | Rowan, Jr. ................. 29/423 |

(Continued)

FOREIGN PATENT DOCUMENTS

CH 247079 11/1947

(Continued)

OTHER PUBLICATIONS

Search Report from CH 11412003 (Oct. 10, 2003).

(Continued)

*Primary Examiner*—Brian Glessner
*Assistant Examiner*—Adriana Figueroa
(74) *Attorney, Agent, or Firm*—Cermak Kenealy & Vaidya LLP; Adam J. Cermak

(57) ABSTRACT

A fastening arrangement of a machine base (8) of a machine on foundations (1). The fastening arrangement includes a foundation recess (3), filled with concrete (7₁, 7₂) and having an inner anchor shank (4), a foundation plate (2) of steel on the foundation (1), the machine base (8) on the foundation plate (2), an anti-fatigue bolt/stud bolt (9) restraining the machine against the foundation (1), the anti-fatigue bolt/stud bolt (9) being screwed into the anchor shank (4). The anchor shank (4) has at least two threaded disks (5) arranged offset from one another. The anti-fatigue bolt/stud bolt (9) screwed into the anchor shank (4) is passed through the foundation plate (2) and the machine base (8).

5 Claims, 1 Drawing Sheet

U.S. PATENT DOCUMENTS

| | | | | |
|---|---|---|---|---|
| 5,282,602 | A | * | 2/1994 | Zimmermann ............... 248/680 |
| 5,379,563 | A | * | 1/1995 | Tinsley ......................... 52/295 |
| 5,807,051 | A | * | 9/1998 | Heminger .................... 411/82 |

FOREIGN PATENT DOCUMENTS

| | | | |
|---|---|---|---|
| CH | 659873 | | 2/1987 |
| CH | 676 876 | A5 | 3/1991 |
| CH | 676876 | | 3/1991 |
| DE | 439891 | | 7/1927 |
| DE | 1 575 328 | | 1/1970 |
| DE | 2 011 458 | | 10/1970 |
| DE | 2011468 | | 10/1970 |
| DE | 2 121 342 | | 11/1972 |
| DE | 2 304 132 | | 8/1974 |
| DE | 2304132 | | 8/1974 |
| DE | 25 24 682 | | 11/1976 |
| DE | 2524682 | | 11/1976 |
| DE | 41 39 387 | A1 | 6/1983 |
| DE | 37 15 977 | | 11/1990 |
| DE | 4139387 | | 6/1993 |
| DE | 42 27 924 | A1 | 2/1994 |
| DE | 4227924 | | 2/1994 |
| DE | 4227924 | A1 * | 2/1994 |
| DE | 43 35 485 | A1 | 4/1995 |
| DE | 4335485 | | 4/1995 |
| DE | 100 09 072 | A1 | 8/2001 |
| DE | 10009072 | | 8/2001 |

OTHER PUBLICATIONS

Search Report for European Patent Appl. No. EP04102897 (Apr. 25, 2005).

* cited by examiner

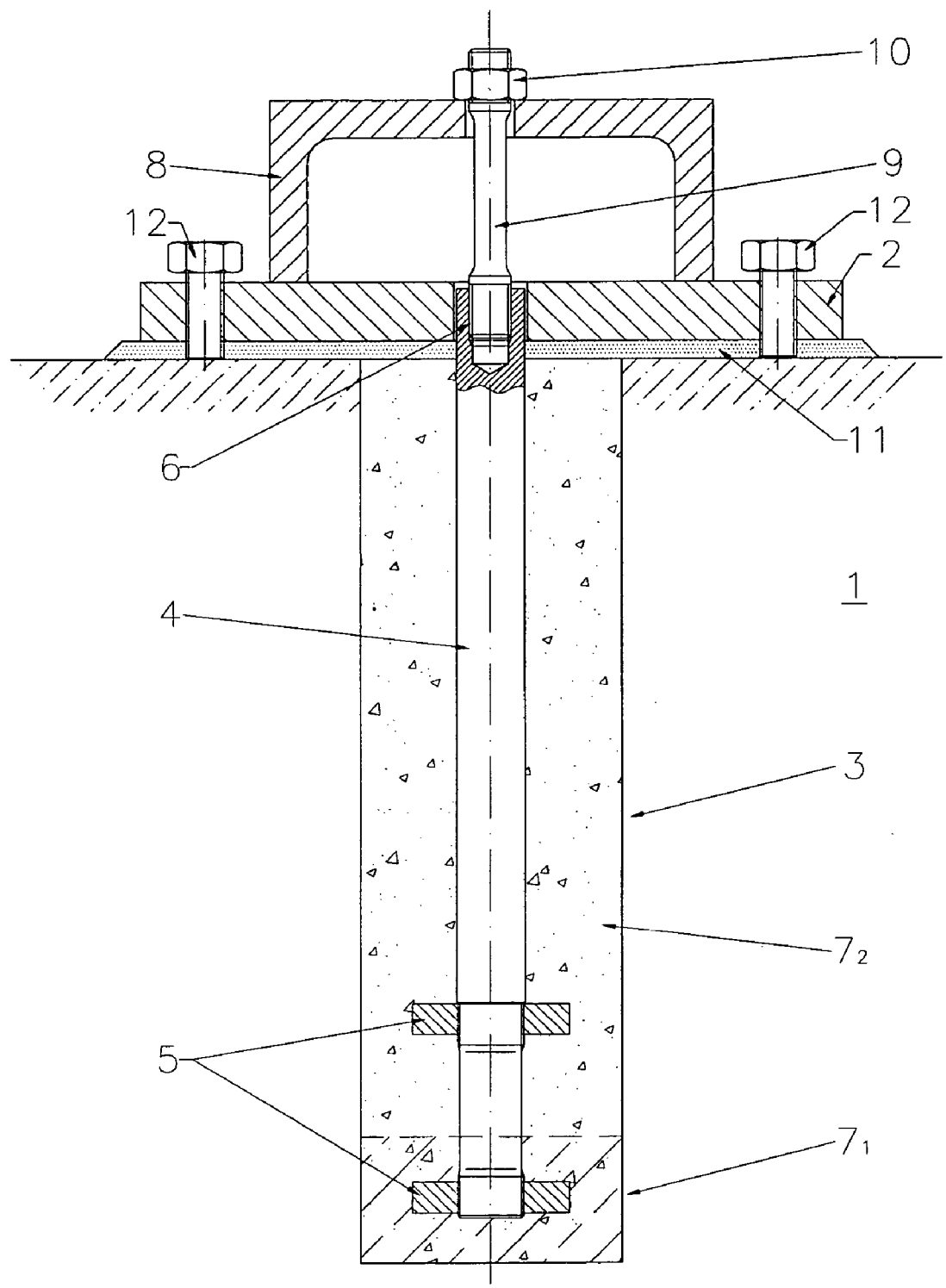
Fig.

FASTENING ARRANGEMENT OF A MACHINE BASE AND METHOD OF FASTENING THE SAME

This application claims priority under 35 U.S.C. § 119 to Swiss Application No. 01141/03, filed 27 Jun. 2003, the entirety of which is incorporated by reference herein.

BACKGROUND OF THE INVENTION

1. Field of the Invention

The present invention relates to a fastening arrangement of a machine base and to a method of fastening a machine base of a machine.

2. Brief Description of the Related Art

Foundation anchors are normally used to fasten machines or other components on their foundation, which is usually precast from concrete. The anchor screws or bolts used in this case are screwed with their bottom threaded shank into threaded plates which are fastened in or to the foundation. With their top threaded shank, the machine to be fastened is fastened to the machine base by means of a nut. The foundation anchors in particular of large machines must be designed for the direct transmission of very large forces (usually malfunction forces) and prevent the machine from lifting from the foundation. In addition, compensating elements must be provided in order to be able to orient the machines or the entire machine set.

Such foundation anchors have been disclosed, for example, by the publications U.S. Pat. No. 2,952,947, DE-A-25 24 682, U.S. Pat. No. 3,401,733, DE-A1-42 27 924, DE-A1-41 39 387, CH-A5-676 876, DE-A1-43 35 485, DE-A1-100 09 072 or DE-A-2 011 468.

Many of these embodiments either use means for compensating for the height, or alternatively have wedges (CH-A5-676 876, FIG. 1) arranged for flatness compensation. However, a disadvantage with DE-A-25 24 682, DE-A-2 304 132 and DE-A1-41 39 387 is that the machine cannot be pushed over a flat surface onto the main foundation.

Publication DE-A-2 304 132 discloses a solution for anchoring an anchor shank in the foundation and for restraining the machine base. Furthermore, there is a spatially adjustable support which is vertically adjustable and is at the same time provided with an adjusting screw for the flatness compensation. Less advantageous, however, is the fact that, firstly, the support is cast in place in the foundation. Secondly, the anchoring parts project from the foundation during the installation. These anchoring parts are therefore a hindrance during the setting-up of the machine. In addition, there is a risk of injury due to the projecting anchor bolts.

SUMMARY OF THE INVENTION

Accordingly, one of numerous aspects of the present invention includes avoiding the disadvantages which are known from the prior art. Another aspect of the present invention includes providing a method of fastening a machine base and, in addition to providing the fastening of a machine base of a machine, this fastening can be distinguished by a simple construction. This is intended in particular to reduce the complexity of the fastening.

It is advantageous that the anchor shank is sunk in the foundation, so that the setting-up of the machine is in no way impaired. The actual installation is then effected via an anti-fatigue bolt or stud bolt which is screwed through the foundation plate and the machine base into the top part of the anchor shank and restrained. The anti-fatigue bolt or stud bolt, or the anchoring system, can be preloaded hydraulically or by a torque wrench.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawing. The invention is illustrated with reference to the attached figure, which shows a foundation of a machine having an inner anchor shank. Only the elements essential for the invention are shown.

DETAILED DESCRIPTION OF THE PREFERRED EMBODIMENTS

A method of fastening a machine base 8 of a machine on a foundation 1 and also a corresponding fastening arrangement are described. Both are explained in more detail with reference to the attached figure. In a specific exemplary embodiment, the machine to be fastened is a thermal turbomachine or parts thereof, that is to say, for example, a gas or steam turbine, a compressor, a generator or a gear unit. However, the present invention is in no way restricted thereto.

As shown in the single figure, the foundation 1 has a foundation recess 3. An anchor shank 4 is located inside this foundation recess 3. In the figure, the anchor shank 4, at the bottom end, has two threaded disks 5 arranged offset from one another. The anchor shank 4 is narrowed in the shank diameter between both threads, so that the top threaded disk 5 can be screwed over the bottom thread of the anchor shank 4.

After that, a first layer of concrete $7_1$ is first of all poured into the foundation recess 3, so that at least the bottom threaded disk 5 is cast in place. After the first layer $7_1$ has hardened, a second layer of concrete $7_2$ is poured in and fills the remaining part of the foundation recess 3. The threaded disks 5, which are each fastened with threads to the anchor shank 4, form an abutment or a stop in interplay with the foundation recess 3 filled with concrete $7_1$, $7_2$, so that, after the fastening has been effected, the machine base 8 can be restrained. The threaded disks 5 are secured against rotation by threaded locking means.

Since the anchor shank 4 is sunk in the foundation recess 3, the setting-up of the machine is in no way impaired. In this case, a foundation plate 2 serves as seating for the machine. Said foundation plate 2 is completely cast in place by fine cast concrete 11. The machine base 8 is put onto the foundation plate 2 oriented or leveled with adjusting screws 12, and the anchor shank 4, by means of an anti-fatigue bolt/stud bolt 9, is connected through the machine base 8 to an internal thread 6 connected in the anchor shank 4. As can be seen from the figure, as the last method step of the fastening, the anchor shank 4 is preloaded by a top clamping nut 10. The anti-fatigue bolt or stud bolt 9 screwed into the anchor shank 4 can be readily fitted by a torque wrench or even preloaded hydraulically. After the preloading, the clamping nut 10 is secured against loosening. The adjusting screws 12 are then removed.

Obviously, numerous modifications and variations of the present invention are possible in light of the above teachings. It is therefore to be understood that, within the scope of the appended claims, the invention may be practiced otherwise than as specifically described herein.

While the invention has been described in detail with reference to preferred embodiments thereof, it will be apparent to one skilled in the art that various changes can be made, and equivalents employed, without departing from the scope of the invention. Each of the aforementioned documents is incorporated by reference herein in its entirety.

LIST OF DESIGNATIONS

1 Foundation
2 Foundation plate
3 Foundation recess
4 Anchor shank
5 Threaded disk
6 Internal thread
$7_1, 7_2$ Concrete
8 Machine base
9 Anti-fatigue bolt/stud bolt
10 Clamping nut
11 Fine cast concrete
12 Adjusting screw

What is claimed is:

1. A fastening arrangement of a machine base of a machine on foundations, comprising:
   a foundation including a foundation recess and a foundation plate of steel on a surface of the foundation;
   a machine base on a surface of the foundation plate;
   an anchor shank configured and arranged to restrain the machine against the foundation, the anchor shank located in the foundation recess, having a bottom end including at least two threaded disks offset from one another, and having a top end with an inner thread;
   the foundation recess being filled with concrete;
   an anti-fatigue bolt or a stud bolt passing though the foundation plate and the machine base, the bolt screwed into the inner thread of the anchor shank and preloaded; and
   wherein the top end of the anchor shank ends outside of the foundation recess but within the foundation plate.

2. The fastening arrangement as claimed in claim 1, wherein the anchor shank has a narrowed shank diameter between the two threads of the threaded disks.

3. The fastening arrangement as claimed in claim 1, further comprising:
   threaded locking means for securing the threaded disks against rotation.

4. The fastening arrangement as claimed in claim 1, further comprising:
   a clamping nut preloading the anti-fatigue bolt or the stud bolt.

5. The fastening arrangement as claimed in claim 1, further comprising:
   a layer of fine concrete located between the surface of the foundation and the foundation plate.

* * * * *